United States Patent
Bybell et al.

(10) Patent No.: US 10,037,283 B2
(45) Date of Patent: Jul. 31, 2018

(54) UPDATING LEAST-RECENTLY-USED DATA FOR GREATER PERSISTENCE OF HIGHER GENERALITY CACHE ENTRIES

(71) Applicant: Advanced Micro Devices, Inc., Sunnyvale, CA (US)

(72) Inventors: Anthony J. Bybell, Austin, TX (US); John M. King, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 36 days.

(21) Appl. No.: 15/235,214

(22) Filed: Aug. 12, 2016

(65) Prior Publication Data

US 2018/0046583 A1    Feb. 15, 2018

(51) Int. Cl.
*G06F 12/123* (2016.01)
*G06F 12/1027* (2016.01)

(52) U.S. Cl.
CPC ........ *G06F 12/1027* (2013.01); *G06F 12/124* (2013.01); *G06F 2212/1016* (2013.01); *G06F 2212/684* (2013.01); *G06F 2212/69* (2013.01)

(58) Field of Classification Search
None
See application file for complete search history.

(56) References Cited

U.S. PATENT DOCUMENTS

| | | | | |
|---|---|---|---|---|
| 6,732,238 B1* | 5/2004 | Evans | ................ | G06F 12/0864 365/49.1 |
| 6,748,492 B1* | 6/2004 | Rowlands | ............ | G06F 12/121 711/128 |
| 2003/0093644 A1* | 5/2003 | Fanning | ................ | G06F 12/127 711/210 |
| 2006/0277351 A1* | 12/2006 | Osanai | ................... | G06F 12/126 711/3 |
| 2006/0277389 A1* | 12/2006 | Hepkin | ............... | G06F 12/1027 711/203 |
| 2008/0114940 A1 | 5/2008 | Ito | | |
| 2010/0318742 A1 | 12/2010 | Plondke et al. | | |
| 2011/0010502 A1* | 1/2011 | Wang | .................... | G06F 12/121 711/128 |
| 2011/0078381 A1* | 3/2011 | Heinrich | ............. | G06F 12/0842 711/122 |
| 2013/0173861 A1* | 7/2013 | Comparan | .......... | G06F 12/0817 711/122 |
| 2013/0254490 A1 | 9/2013 | Olszewski et al. | | |

(Continued)

OTHER PUBLICATIONS

Seznec, Andre, "Concurrent Support of Multiple Page Sizes on a Skewed Associative TLB", IEEE Transactions on Computers, Jul. 2004, pp. 924-927, vol. 53, Issue 7, IEEE Computer Society, Washington, DC, USA.

*Primary Examiner* — Mano Padmanabhan
*Assistant Examiner* — Jean C Edouard

(57) ABSTRACT

Techniques for improving translation lookaside buffer (TLB) operation are disclosed. A particular entry of the TLB is to be updated with data associated with a large page size. The TLB updates replacement policy data for that TLB entry for that large page size to indicate that the TLB entry is not the least-recently-used. To prevent smaller pages from evicting the TLB entry for the large page size, the TLB also updates replacement policy data for that TLB entry for the smaller page size to indicate that the TLB entry is not the least-recently-used.

17 Claims, 5 Drawing Sheets

(56) References Cited

U.S. PATENT DOCUMENTS

2013/0262778 A1* 10/2013 Ghai .................... G06F 12/121
                                                    711/136
2014/0095784 A1*  4/2014 Tran .................... G06F 12/1027
                                                    711/108
2014/0189192 A1   7/2014 Raikin et al.
2014/0304477 A1* 10/2014 Hughes .............. G06F 12/0891
                                                    711/133
2016/0196214 A1*  7/2016 Hooker .............. G06F 12/0877
                                                    711/128
2017/0046278 A1*  2/2017 Clancy ................. G06F 12/123

* cited by examiner

US 10,037,283 B2

UPDATING LEAST-RECENTLY-USED DATA FOR GREATER PERSISTENCE OF HIGHER GENERALITY CACHE ENTRIES

BACKGROUND

A translation lookaside buffer ("TLB") is a cache that stores virtual-to-physical address translations for use in addressing a memory system. TLBs can speed up computer operation because a large number of operations reference memory using virtual addresses. Without TLBs, such operations would need to access main system memory in order to obtain translations, thereby incurring a large amount of latency. Improvement in TLB operation can therefore improve the speed of computer operation.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to techniques for improving operation of translation lookaside buffers ("TLBs"). When a particular entry of the TLB is to be updated with data associated with a large page size, the TLB updates replacement policy data (such as least-recently-used ("LRU") data) for that TLB entry for that large page size to indicate that the TLB entry is not the least-recently-used. To prevent smaller pages from evicting the TLB entry for the large page size, the TLB also updates replacement policy data for that TLB entry for the smaller page size to indicate that the TLB entry is not the least-recently-used.

Adjusting LRU data for smaller page sizes to indicate that a modified TLB entry is not the least-recently used entry for those page sizes helps to prevent TLB entries for smaller memory pages from evicting TLB entries for larger page sizes. Thus, translations for large pages are more "persistent" than translations for smaller pages. Translations for larger pages service a larger portion of system memory. Thus, making translations for larger pages more persistent helps to allow the TLB to service a larger portion of system memory at any given time, which reduces the amount of misses that occur in the TLB, and reduces the total latency associated with obtaining translations from the page tables. This also improves overall speed and performance of the TLB and of memory operations using virtual addresses in general.

Figure 1:
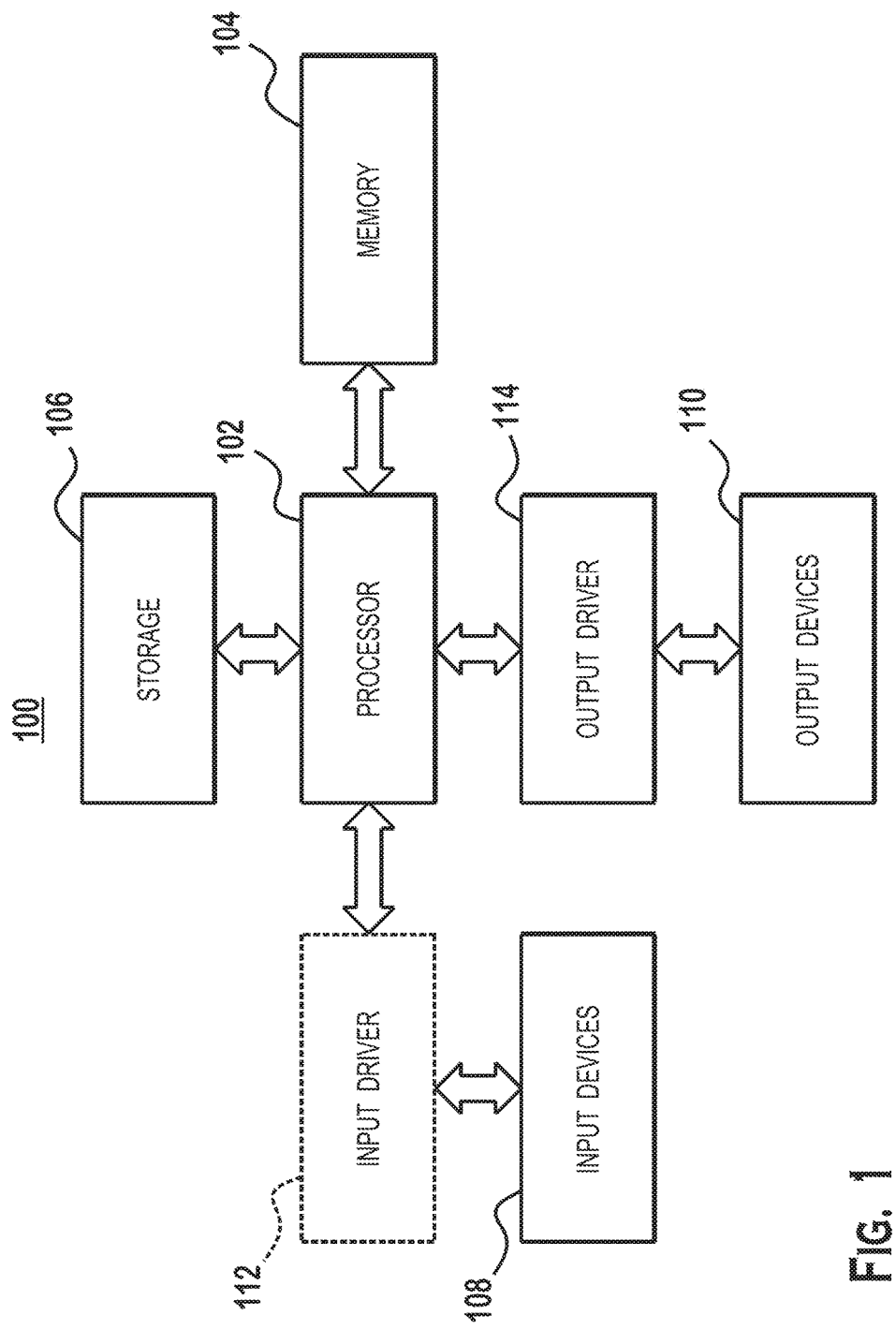
FIG. 1 is a block diagram of an example device in which one or more disclosed embodiments may be implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 may also optionally include an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core is a CPU or a GPU. The memory 104 may be located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
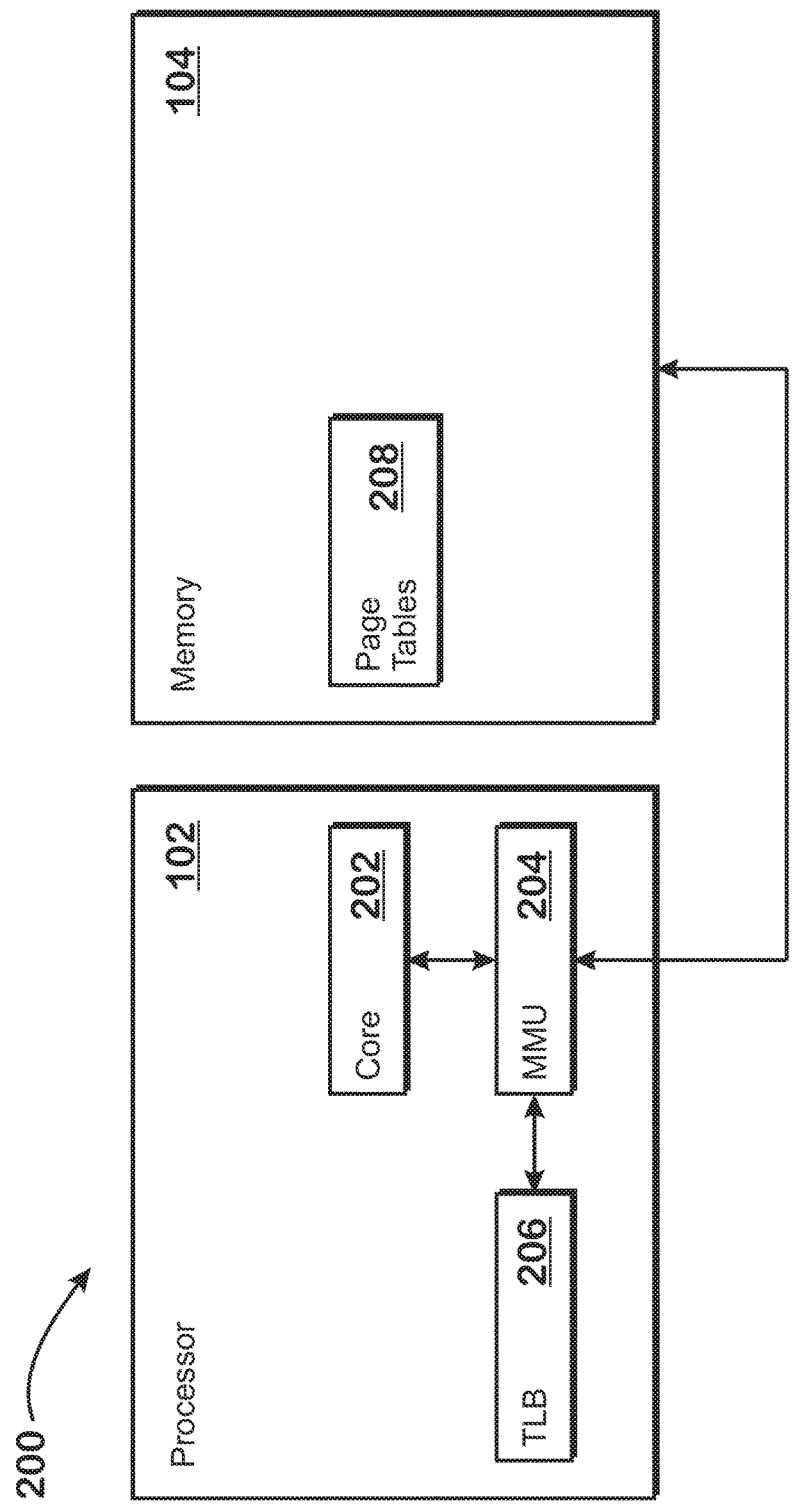
FIG. 2 is a block diagram of a processor-memory interface system, according to an example.

FIG. 2 is a block diagram illustrating aspects of a processor-memory interface system 200, according to an example. As shown, the processor-memory interface system 200 includes the processor 102 of FIG. 1 and the memory 104 of FIG. 1.

The processor 102 includes a core 202 which executes instructions to process data. The processor 102 also includes a memory management unit (MMU) 204 coupled to a translation lookaside buffer (TLB) 206. Instructions executed by the processor 102 may refer to memory via physical addresses (typically associated with operating-system operation) or virtual addresses (typically associated with user-mode applications). Using virtual address spaces for applications isolates such applications, preventing the applications from accidentally interfering with the operations of other applications or with the operating system by writing to memory associated with those applications or the operating system.

To facilitate access of memory 104 via virtual addresses, the processor 102 includes an MMU 204. The MMU 204 translates virtual addresses received from the core 202 into physical addresses and accesses memory 104 via those physical addresses. Data indicating how virtual addresses are to be translated into physical addresses are stored in page tables 208 in memory 104. Addresses are not translated down to the byte or word, but instead are translated down to the page number. More specifically, the page tables 208 translate virtual page numbers, which include a sufficient number of the most significant bits of an address to represent a single page, into physical page numbers. Least significant bits of the address are not translated and are the same in both physical and virtual addresses.

The TLB 206 acts as a cache for the page tables 208. Without a TLB 206, every virtual memory address lookup would require an access to system memory 104, increasing memory access latency. The caching provided by the TLB 206 helps to reduce this latency. However, the TLB 206 usually does not include a full copy of all translations in the page tables 208. In operation, as part of executing a memory access instruction, the core 202 requests translation of a virtual memory address from MMU 204. In response, the MMU 204 searches the TLB 206 for a translation. In the event of a cache hit (meaning the TLB 206 includes the translation), the MMU 204 obtains the physical address from the translation and sends a memory access request to memory 104 using the obtained physical address. In the event of a cache miss (meaning the TLB 206 does not include the translation), the MMU 204 performs a page table walk, searching the page tables 208 for the needed translation. The MMU 204 then places that translation in the TLB 206, evicting another entry if insufficient space is present in the TLB 206. The MMU 204 performs the memory access based on the recently-obtained translation.

One aspect of address translation that presents difficulty is the possibility of differing page sizes. More specifically, the option of having different sized memory pages stored in memory 104 raises the question of how to cache translations for pages of different sizes in the TLB 206.

Figure 3:
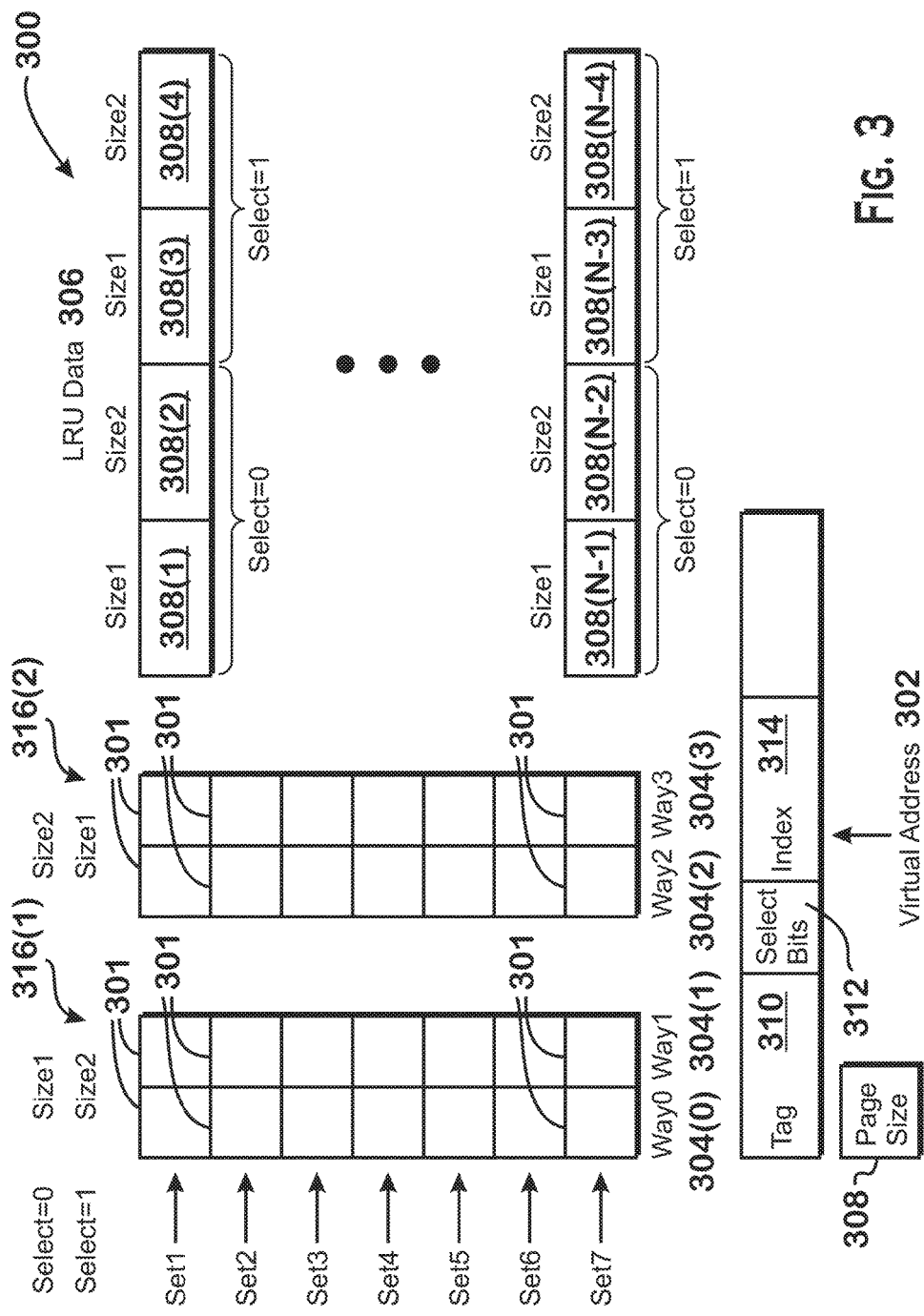
FIG. 3 is a block diagram of a translation lookaside buffer, according to an example.

FIG. 3 is a block diagram of a translation lookaside buffer (TLB) 300, according to an example. As shown, the TLB 300 is implemented as a skewed-associative cache adapted for high performance use as a cache for page tables 208 storing translations for pages of different page sizes. The example TLB 300 illustrated in FIG. 3 includes four ways 304 and seven sets, seven rows of least-recently-used ("LRU") data, and four LRU entries per LRU data row. An example address 302 is illustrated. The example TLB 300 is an example of the TLB 206 illustrated in FIG. 2. The example virtual address 302 includes an index 314, a tag 310, and select bits 312, and is also associated with a particular page size 308. The page size 308 indicates the size of the memory page that stores data at the virtual address 302.

A skewed-associative cache is a variation on set associative caches that allows for a reduced chance of cache misses. Caches provide payload data in response to a lookup. For various types of caches (including set associative caches), a cache index portion of an address is used to identify entries in the cache that can store data for addresses having that index. In a direct-mapped cache, the cache index uniquely identifies a single entry in the cache. Thus, in a direct-mapped cache, an entry for any particular address can only be stored in a single cache entry. In a fully-associative cache, every address can be stored in any cache entry. In a set-associative cache, any particular cache index value can be mapped to a number n of entries in the cache, where n is greater than 1 and less than the size of the cache (an n=1 cache is a direct-mapped cache and an n=cache size cache is a fully associative cache). In set-associative caches, a cache index maps to a particular set, where each set includes multiple cache entries. The entire cache is also divided into n "banks" (which are also referred to as "ways"). A particular cache entry in a set-associative cache is identified by a specific combination of set number and bank ("way") number.

A skewed associative cache is a modification to set-associative caches in which selection of a set is different for different ways. TLB 300 is implemented as a skewed-associative cache. Thus, in TLB 300, any particular address can map to different sets in different ways.

In addition, the skewed-associative TLB 300 accommodates translations for pages of different sizes. More specifically, every entry in every way 304 can store translations for every possible page size. Each virtual address has a possible and unique mapping location in each way 304. However, every address and page size combination cannot be stored in every way 304. The ways 304 that can store a particular address are determined by a page size function. The page size function is defined as follows. For any given way I of the TLB 300 and for any given virtual address A, the page P(A) that includes virtual address A can be mapped on way I if and only if the size of the virtual page is S(A,I) where S(A,I) is the page size function. In other words, the page size function indicates, for each virtual address and page size combination, which ways that virtual address can map to. The page size function generates a result based on the select bits 312 of a virtual address 302. Any technically feasible implementation of a page size function can be used.

The functionality of the page size function can also be represented by a select function Sel(A). The select function produces a single numerical value for any given address. The numerical value produced by the select function indicates which page sizes map to which ways. In the example TLB 300 of FIG. 3, the TLB 300 includes four ways. Two of the ways (way 0 and way 1) are grouped together in a first group 316(1) and two other of the ways (way 2 and way 3) are grouped together in a second group 316(2). Further, the TLB 300 is configured to store translations for pages of two different sizes. A value of 0 for the select function indicates that the first group of ways 316(1) stores pages of the first size and the second group of ways 316(2) stores pages of the second size. A value of 1 for the select function indicates that the first group of ways 316(1) stores pages of the second size and the second group of ways 316(2) stores pages of the first size. In one approach, the page size function (and thus the select function) is based on the mapping bits of the virtual address 302 as shown in FIG. 3. In one example select function, different select bits 312 are assigned to different select values. In one example, addresses have three select bits 312. Values 000, 001, 010, and 011 are assigned to select value 0. Values 100, 101, 110, and 111 are assigned to select value 1. Any other technically feasible select function (or page size function) may be used.

The sets that are appropriate for any particular address and page size are determined based on an indexing function. More specifically, the indexing function accepts as input the address, a page size, and the output of the page size function, and outputs a particular set for each way in which the address and page size combination can be stored. In the example of FIG. 3, the indexing function accepts as input the index portion 314 of the virtual address 302, the page size 308, and output of the select function (which is based on the select bits 312 of the virtual address 302) and outputs a set number for each of the ways in which the address can be stored. In one example, the indexing function outputs the same set for each set in a group of ways 316 (where, as described above, the groups of ways 316 include ways 304 that are grouped together for page selection purposes).

As described above, MMU 204 uses the TLB 300 to translate the virtual address 302 into a physical address by indexing the TLB 300 based on the virtual address 302 and page size. Because of the skewed-associative nature of the TLB 300, for any particular virtual address and page size combination, the TLB 300 includes multiple ways that can possibly store that virtual address/page size combination. Thus, to attempt to translate the virtual address 302, the MMU 204 identifies a set based on the indexing function and identifies multiple possible ways based on a page size function. The MMU 204 attempts to match a tag portion 310 of the address 302 to a tag 310 of one of the entries in the identified set and ways. If the tag 310 matches in one of the entries, then a hit occurs and if the tag 310 does not match, then a miss occurs.

In the event of a miss, the MMU 204 requests the translation associated with the virtual address 302 from the page tables 208 and places the received translation in one of the TLB entries 301 of the TLB 300. The MMU 204 determines which TLB entry 301 to place the translation in based on the address 302, the page size 308, and a replacement policy, which examines least-recently-used ("LRU") data 306.

For any particular address and page size combination, the entry for that address can be stored in more than one way 304. To determine which way 304 the fetched translation is to be stored in, the MMU 204 consults the LRU data 306. LRU data 306 includes an LRU entry 308 for each select value/page size combination. In the example TLB 300 of FIG. 3, one LRU entry 308 exists for the select value 0/size 1 combination, one LRU entry 308 exists for the select value 0/size 2 combination, one LRU entry 308 exists for the select value 1/size 1 combination, and one LRU entry 308 exists for the select value 1/size 2 combination. In TLBs with more page sizes, additional LRU entries would be included.

Each LRU entry 308 indicates, for the select value/page size combination, which way 304, of the ways that can store translations for that particular select value/page size combination, is deemed to be the least recently used way. For example, for a select value of 0 and a page size of size 1 (and for set 1), LRU entry 308(1) indicates whether way 0 or way 1 stores the entry 301 deemed to be the least-recently-used entry 301. Similarly, for a select value of 1 and a page size of size 2, LRU entry 308(4) indicates whether way 0 or way 1 stores the entry 301 deemed to be the least-recently-used entry 301.

Note that the above assumes an indexing function that, for any particular group of ways 316, maps any particular address to the same set with that group of ways 316. The term "group of ways" 316 refers to a collection of ways 304 for which, any particular virtual address maps to the same set. In FIG. 3, there are two groups of ways 316. A first group of ways 316 includes way 0 and way 1, and a second group of ways 316 includes way 2 and way 3.

The notion of "groups of ways" 316 allows LRU data to be stored on a per select value/page size basis. More specifically, this notion allows for a meaningful comparison to be made between different ways once the MMU 204 determines which group of ways 316 a particular address/page size combination can be mapped to. In an example, once the MMU 204 has determined that a particular address/page size combination belongs in the group of ways 316 consisting of way 0 and way 1, the grouping of ways 304 means that the corresponding LRU entry 308 allows the MMU 204 to identify one of the ways in the group of ways 316 as the least-recently-used way.

In one example of a replacement algorithm, each group of ways 316 includes two ways 304. The LRU data 306 includes one LRU entry 308 per set, select function value, and page size combination. Each LRU entry 308 is one bit. The bit indicates, for a particular page size, which of the two ways in a particular group of ways 316 stores the least-recently used TLB entry and thus which one is replaced when the MMU 204 writes a newly-fetched translation to the TLB. In one example, an entry associated with a first set, with a first group of ways 316 (way 0 and way 1), and with a first page size indicates that way 0 stores the least-recently-used TLB entry. An entry associated with the same set and group of ways 316 (way 0 and way 1) and with a second page size indicates that way 1 stores the least-recently-used TLB entry. These particular values mean that replacement within the group of ways 316 will occur differently depending on whether the address to be translated is within a memory page of the first page size or the second page size.

Although a specific LRU replacement policy is described herein, other replacement policies are possible. For example, replacement algorithms using psuedo-LRU ("PLRU"), tree-pLRU, and so on could be used. Additionally, the replacement algorithms may be used in scenarios in which groups of ways 316 include more than two ways 304. In such scenarios, each LRU data entry may store more than one bit.

The fact that large pages and small pages can both be stored in any particular way 304 means that small pages can replace large pages. Further, the fact that LRU data is stored on a per-page-size basis means that the replacement data for one page size might indicate that a particular TLB entry should be replaced while replacement data for another page size might indicate that a different TLB entry should be replaced. This possibility means that it is possible for a translation for a small page to cause eviction of a translation for a large page in a situation where it is not advantageous for such an eviction to occur.

In one example, the MMU 204 writes a TLB entry for a small page size in set 1, way 0 and updates the corresponding LRU entry to indicate that for small pages and in set 1, out of way 0 and way 1, way 1 is the least-recently used. Subsequently, the MMU 204 writes a TLB entry for a large page size in set 1, way 1 and updates the corresponding LRU entry to indicate that for the large page size and set 1, out of way 0 and way 1, way 0 is the least-recently used. Subsequently, the MMU 204 writes a TLB entry for a small page size into set 1. Based on the LRU data, the MMU 204 determines that in set 1 and for small pages, out of way 0 and way 1, way 1 is the least recently used. Thus, the MMU 204 writes the TLB entry for the small page size into set 1, way 1. However, this action causes the newly-added TLB entry for the large page, which is stored in set 1, way 1, to be evicted.

Effectively, a new translation for a small page has evicted a new translation for a large page. This action is undesirable because translations for large pages should take priority over translations for small pages. More specifically, because translations for large pages cover more of system memory than translations for small pages, evicting translations for large pages to add translations for small pages has the effect of reducing the portion of system memory that the TLB can service, thereby increasing the likelihood of a miss occurring in the TLB. When a translation for a small page is to be written to the TLB, that translation needs to be stored somewhere. However, storing that translation in a TLB entry that is not the least-recently-used entry for large page sizes causes eviction of a translation for a large page size that is considered more relevant than the least-recently-used entry for large page sizes (at least from the perspective of least-recently-used replacement semantics). For these reasons, additional replacement algorithm techniques are provided below.

Figure 4:
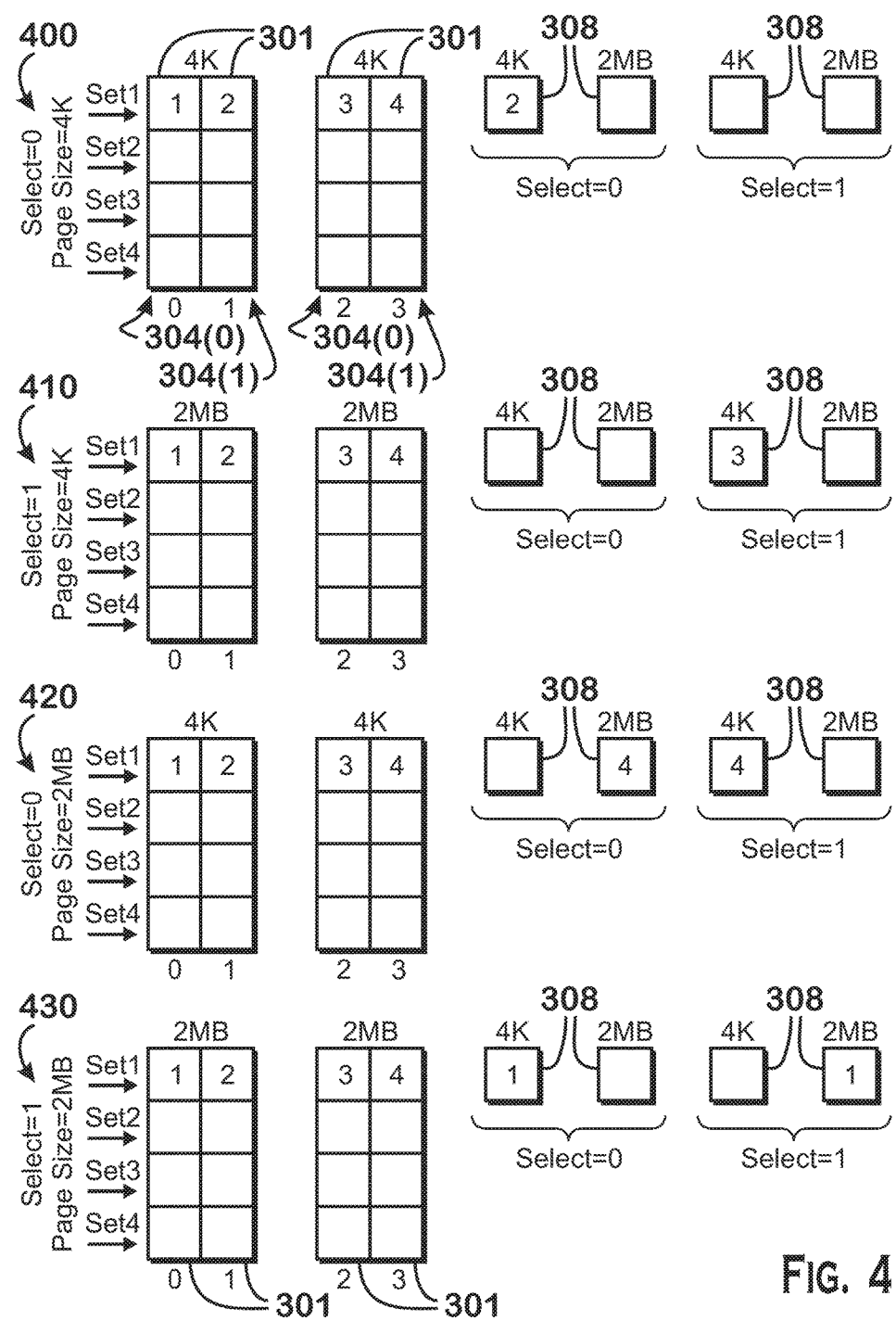
FIG. 4 is a block diagram illustrating operations for modifying least-recently-used data in the event of a cache miss, according to an example.

FIG. 4 is a block diagram illustrating operations for modifying LRU data in the event of a cache miss, according to an example. As shown, FIG. 4 illustrates a first operation 400, a second operation 410, a third operation 420, and a fourth operation 430.

The first, second, third, and fourth operations illustrate a technique for modifying LRU data in a manner that allows translations for larger pages to be more persistent in the LRU than translations for smaller pages. In general, these operations involve updating LRU data for smaller size pages when LRU data for larger size pages are updated. More specifically, when the MMU 204 determines that a translation for a large page is to be placed in the TLB, the MMU 204 updates both the LRU data entry 308 for that large page as well as the LRU data entry 308 for a corresponding small page. More specifically, upon detecting a cache miss for an address within a large size page, the MMU 204 identifies a particular TLB entry in which to place the translation for that large page. Note this TLB entry is defined by a particular set and way. The MMU 204 places the translation in that TLB entry and updates corresponding LRU data to indicate that the recently updated TLB entry does not contain least-recently-used data. This updated LRU data is defined by select value, set, and page size. In addition, the MMU 204 updates the LRU data for the same TLB entry (defined by set and select value) and for the smaller page size to indicate that the same TLB entry is not the least-recently-used entry. This additional update to the smaller page size has the effect of preventing a subsequent update to the same group 316 of ways for the smaller page size from evicting the recently-added translation for the large page size.

In effect, this additional update operation causes the translation for the larger page size to be more persistent than if this additional update operation did not occur. Translations for larger pages service a larger portion of system memory. Thus, making translations for larger pages more persistent helps to allow the TLB 300 to service a larger portion of system memory at any given time, which reduces the number of misses that occur in the TLB 300, reducing the total latency associated with obtaining translations from the page tables 208 and improving overall speed and performance of the TLB 300 and of memory operations using virtual addresses in general.

The operations illustrated in FIG. 4 are examples of the above technique. Each operation in FIG. 4 shows several sets of the TLB, four ways grouped into two way groups 316 (0, 1 and 2, 3), and LRU data for the first set. For simplicity, LRU data is not illustrated for any set other than the first set although it should be understood that each set would have corresponding LRU data.

In the first operation 400, the MMU 204 has already begun to process a translation for an address within a page of page size 4K (in this example, 4K is the small page size and 2 MB is the large page size). The MMU 204 has also determined that a miss in the TLB occurred, has received a translation from the page tables 208, has calculated the select value as 0 based on the address, has identified ways that match the select value of 0 and page size of 4K, and has identified a set (the top-most set in the figure) based on the address and the page size function. The MMU 204 has also identified a group of ways 316 (comprising 0 and 1) in which to store the newly received translation and has identified one of the ways in which to store the translation based on LRU data 306. The way that is identified is way 0. Thus, the MMU 204 has determined that the newly received translation is to be stored in the TLB entry found at set 1 and way 0—a TLB entry marked with numeral "1." In response to this determination, the MMU 204 updates the LRU data 306. Specifically, the MMU 204 updates the LRU data entry 308 for select value 0, page size 4K, and set 1 to indicate that the least recently used TLB entry is TLB entry 2. Because 4K is the smallest page size, the MMU 204 does not update any other LRU data.

The second operation—operation 410—is similar to operation 400 except that the select value is 1. The page size is still 4K. Because the select value is 1, the fetched translation replaces a TLB entry in one of way 2 and way 3 (specifically, TLB entry 3, in way 2) instead of a TLB entry in one of way 0 and way 1. As with operation 400, because the page size is 4K, the MMU 204 does not update any other LRU data.

The third operation—operation 420—is an operation in which the address for translation is an address in a large size (2 MB) page. A miss occurs in the TLB and the MMU 204 obtains the translation from the page tables 208. The MMU 204 processes this address and determines that the select value is 0. The MMU 204 examines the LRU data 306 and determines that the TLB entry in which to store the recently received translation is the TLB entry marked 3. After determining which TLB entry to store the translation retrieved from the page tables 208 in, the MMU 204 updates the LRU data 306 for the select value and page size combination. More specifically, the MMU 204 updates the LRU data entry 308 corresponding to select value 0 and page size 2 M to indicate that TLB entry marked 4 is the least recently used entry (since entry 3 was just written to). Additionally, because the address fetched is for an address in a memory page having a large page size, the MMU 204 updates the LRU data entry 308 that corresponds to the same group of ways 316 but for the smaller page size. This LRU data entry is the data entry for select value 1 and page size 4K. The MMU 204 updates this LRU data entry to also indicate that TLB entry 4 is the least recently used. Updating the LRU data entry for this smaller sized page helps to prevent a TLB miss for the same set of ways from evicting the just-written TLB entry for the large page size.

The fourth operation 430 is similar to the third operation 420 except that the address for the fourth operation evaluates to select value 1 instead of select value 0. Thus instead of updating select0/2 MB and select1/4K, the MMU 204 updates select0/4K and select1/2 MB.

The indexing function is shown as evaluating to set 1 in each of the operations for simplicity only; the indexing function may evaluate to any of the sets. Although only two groups of ways, two ways per group, and two page sizes are shown in FIGS. 3 and 4, the techniques described herein can be applied to a TLB having a different number of groups of ways, a different number of ways per group, and a different number of page sizes. For more page sizes, each size has an associated group of ways. When the MMU 204 updates LRU data for a particular page size due to fetching a translation to a corresponding TLB entry, the MMU 204 also updates the LRU data for each smaller page size to indicate that the TLB entry that received the newly retrieved translation is not the least recently used.

Figure 5:
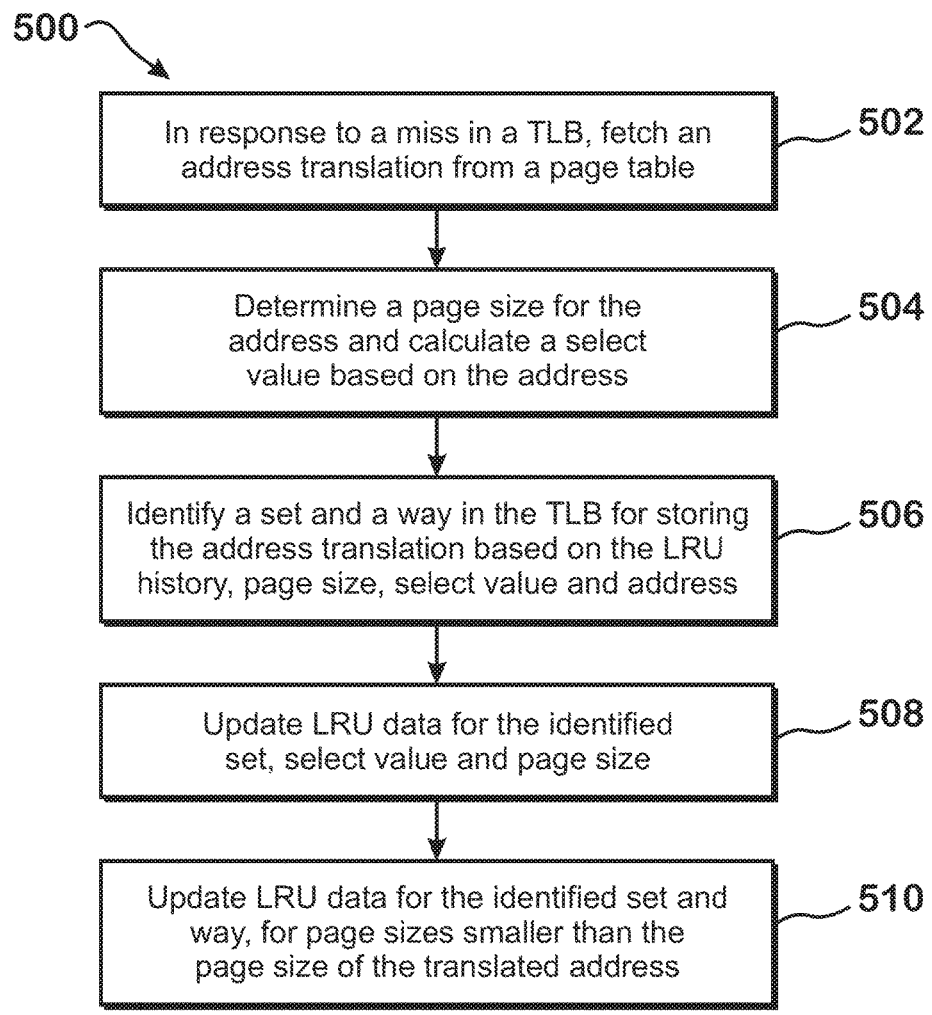
FIG. 5 is a flow diagram of a method for updating least-recently-used data of a translation lookaside buffer, according to an example.

FIG. 5 is a flow diagram of a method 500 for updating least-recently-used data of a translation lookaside buffer, according to an example. Although described with respect to the system shown and described with respect to FIGS. 1-4, it should be understood that any system configured to perform the method, in any technically feasible order, falls within the scope of the present disclosure.

As shown, the method 500 begins at step 502, where the MMU 204 detects a miss in the TLB 300 due to a virtual-to-physical translation not being present in the TLB 300. The MMU 204 fetches the requested translation from a page table 208. At step 504, the MMU 204 determines a page size for the translated virtual address. Page size information for any particular address may be retrieved from the page tables 208 or a set of configuration registers such as, but not limited to, memory type range registers present in the x86 architecture. The MMU 204 also calculates a select value based on a page size function and on the address. The select value indicates which group of ways 316 is assigned to which page size.

At step 506, the MMU 204 identifies a set and way in the TLB for storing the address translation based on the page size, select value, address, and LRU data. More specifically, the MMU 204 identifies the possible ways in which the translation can be stored, based on the page size function and the page size, calculates an indexing result based on an indexing function for the identified ways to determine a set in which the translation can be placed, and identifies a specific way in the identified set in which to store the translation based on LRU data. For example, if LRU data indicates that a particular TLB entry of the identified ways and the identified set is the least-recently-used way, the MMU 204 identifies that TLB entry as the entry in which to place the newly obtained translation.

At step 508, the MMU 204 stores the translation in the identified set and way and updates the LRU data for the identified set, select value, and page size. As described above, LRU data exists for each set and for each select value and page size combination. The LRU data indicates which TLB entry in the identified set and in the appropriate group of ways 316 (identified based on select value and page size) stores the least-recently used data. The MMU 204 updates the LRU data for the set/select value/page size to indicate that a TLB entry within the appropriate group of ways 316 and within the identified set other than the TLB entry that was updated stores the least-recently used data. In one example, each group of ways 316 includes two ways. If an entry in one of the ways is updated in step 508, then the MMU 204 updates the LRU data to indicate that the other way in that group of ways 316 is the least-recently used. In other examples, each group of ways 316 includes more than two ways. In such situations, the MMU 204 updates LRU data for to indicate that other TLB entries in the same set and group of ways 316 as the updated TLB entry include less recently used data than the updated TLB entry.

At step 510, responsive to updating the LRU data for a particular set/select value/page size combination, the MMU 204 also updates the LRU data for the same set, but for a different page size/select value combination. More specifically, the MMU 204 updates the LRU data for the same set as the updated LRU data and for each page size/select value combination that matches the group of ways 316 for which the LRU data is updated at step 508. The MMU 204 updates such LRU data to indicate that the TLB entry that is updated at step 508 is not the least-recently used TLB entry, for each page size smaller than the page size for which the TLB entry is modified at step 508. Updating the LRU data for such smaller page sizes helps to make TLB entries for larger page sizes more persistent than TLB entries for smaller pages.

The techniques described herein improve operation of the TLB. More specifically, adjusting LRU data for smaller page sizes to indicate that a modified TLB entry is not the least-recently used entry for those page sizes helps to prevent TLB entries for smaller memory pages from evicting TLB entries for larger memory pages. Thus, translations for large pages are more "persistent" than translations for smaller pages. Translations for larger pages service a larger portion of system memory. Thus, making translations for larger pages more persistent helps to allow the TLB 300 to service a larger portion of system memory at any given time, which reduces the amount of misses that occur in the TLB 300, reducing the total latency associated with obtaining translations from the page tables 208 and improving overall speed and performance of the TLB 300 and of memory operations using virtual addresses in general.

Although described in the context of a skewed-associative cache, the techniques provided above may also be applied to set-associative caches. Ways in such set-associative caches would still be grouped into groups of ways 316 as described above, where each group of ways 316 would be selected on the basis of a select function (or page size function) that is dependent on the address, but such set-associative caches would not exhibit the skewed-associative property that the same address maps to different sets in different groups of ways 316. Instead, addresses would map to the same set in each group of ways 316. The LRU data for set-associative caches would be stored in a similar manner as described above.

Additionally, although described in the context of translation lookaside buffers in a standard MMU of a computer system, the techniques provided above may be used in other MMUs such as input/output MMUs that provide address translation services for input-output devices rather than for processors such as a CPU. Further, the techniques described above may also be applied in caches other than TLBs, so long as the caches cache address translations of differing levels of generality. For example, the above techniques may be used in a cache that stores internet protocol address translations for different portions of the internet protocol addresses (e.g., XXX,XXX, _____ versus XXX,XXX, XXX, _____ —representing one class of IP addresses versus another class of IP addresses (e.g., class A versus class B)). The term "level of generality" refers to the portion of an address space covered by a particular cache entry. For TLBs, a "greater level of generality" corresponds to translations for a larger page size and a "smaller level of generality" (or a "more specific level of generality") corresponds to translations for a smaller page size. For IP address translation, translations for smaller IP address portions (thus covering more total IP addresses) would have a greater level of generality than translations for larger IP address portions. In any implementation, the above teachings dictate that when updating replacement policy data for cache entries having greater levels of generality, similar updates to replacement policy data for the same cache entries having smaller levels of generality are also made. For any cache implementation that is not a TLB, operations of the MMU can be considered to be performed by a cache controller that manages such cache.

Although some example LRU mechanisms are provided above, the LRU mechanism may be any technically feasible LRU technique (or even non-LRU replacement techniques). Additionally, any technically feasible page size function, select function, and indexing function may be used.

A method for updating replacement policy data for a cache that includes a translation lookaside buffer is disclosed herein. An update to a first cache entry of the cache is detected. A first modification to a first replacement policy data entry corresponding to the first cache entry is detected, the first replacement policy data entry being associated with a first page size. A second replacement policy data entry associated with a second page size that is smaller than the first page size is identified, the second replacement policy data entry also being associated with the first cache entry. The first modification is made to the second replacement policy data entry.

In some examples, the first cache entry is configured to store translations from virtual addresses to physical addresses. In some examples, the cache includes a plurality of ways grouped into a plurality of groups of ways, the first replacement policy data entry stores replacement policy data for a first group of ways, of the groups of ways, that includes the first cache entry, and the second replacement policy data entry stores replacement policy data for the first group of ways.

In some examples, the first cache entry stores a translation for a first memory page and the first memory page maps to a first set of the cache in the first group of ways and to a second set in the cache in a second group of ways of the plurality of groups of ways, the second set being a different set than the first set. In some examples, the method also includes detecting a miss in the cache, responsive to the miss, fetching an item to be placed in the cache, identifying a set and a group of ways for the item based on an address associated with the item and on a page size associated with the item, and identifying a way of the group of ways based on the first replacement policy data entry. The update to the first cache entry of the cache is performed on the identified way, set, and group of ways. In some examples, identifying the way of the group of ways includes determining that the first replacement policy data entry indicates that the way of the group of ways stores a least-recently-used cache entry for the page size associated with the item.

In some examples, the first replacement policy data entry includes one bit that indicates which way of the group of ways includes least-recently-used data. In some examples, the method further includes detecting a second update to a second cache entry of the cache, detecting a second modification to a third replacement policy data entry corresponding to the second cache entry, the third replacement policy data entry being associated with the second page size, and determining that the second page size is the smallest page size for data in the cache, where no other replacement data is modified responsive to the third replacement policy data entry being associated with the smallest page size for data in the cache.

A cache is also provided herein. The cache includes a cache memory storing cache data, the cache memory comprising a translation lookaside buffer, a replacement policy memory storing replacement policy data, and a cache controller. The cache controller is configured to detect an update to a first cache entry of the cache memory, detect a first modification to a first replacement policy data entry corresponding to the first cache entry, the first replacement policy data entry being associated with a first page size, identify a second replacement policy data entry associated with a second page size that is smaller than the first page size, the second replacement policy data entry also being associated with the first cache entry, and make the first modification to the second replacement policy data entry.

In some examples, the first cache entry is configured to store translations from virtual addresses to physical addresses. In some examples, the cache includes a plurality of ways grouped into a plurality of groups of ways, the first replacement policy data entry stores replacement policy data for a first group of ways, of the groups of ways, that includes the first cache entry, and the second replacement policy data entry stores replacement policy data for the first group of ways.

In some examples, the first cache entry stores a translation for a first memory page and the first memory page maps to a first set of the cache in the first group of ways and to a second set in the cache in a second group of ways of the plurality of groups of ways, the second set being a different set than the first set. In some examples, the cache controller is also configured to detect a miss in the cache, responsive to the miss, fetch an item to be placed in the cache, identify a set and a group of ways for the item based on an address associated with the item and on a page size associated with the item, and identify a way of the group of ways based on the first replacement policy data entry. The update to the first cache entry of the cache is performed on the identified way, set, and group of ways. In some examples, identifying the way of the group of ways includes determining that the first replacement policy data entry indicates that the way of the group of ways stores a least-recently-used cache entry for the page size associated with the item.

In some examples, the first replacement policy data entry includes one bit that indicates which way of the group of ways includes least-recently-used data. In some examples, the cache controller is further configured to detect a second update to a second cache entry of the cache, detect a second modification to a third replacement policy data entry corresponding to the second cache entry, the third replacement policy data entry being associated with the second page size, and determine that the second page size is the smallest page size for data in the cache, where no other replacement data is modified responsive to the third replacement policy data entry being associated with the smallest page size for data in the cache.

A processor is also provided that includes an execution pipeline configured to execute instructions and a cache including a cache memory storing cache data, the cache memory comprising a translation lookaside buffer for converting virtual memory addresses of the instructions into physical memory addresses, a replacement policy memory storing replacement policy data, and a cache controller. The cache controller is configured to detect an update to a first cache entry of the cache memory, detect a first modification to a first replacement policy data entry corresponding to the first cache entry, the first replacement policy data entry being associated with a first page size, identify a second replacement policy data entry associated with a second page size that is smaller than the first page size, the second replacement policy data entry also being associated with the first cache entry, and make the first modification to the second replacement policy data entry.

In some examples, the first cache entry is configured to store translations from virtual addresses to physical addresses. In some examples, the cache includes a plurality of ways grouped into a plurality of groups of ways, the first replacement policy data entry stores replacement policy data for a first group of ways, of the groups of ways, that includes the first cache entry, and the second replacement policy data entry stores replacement policy data for the first group of ways. In some examples, the first cache entry stores a translation for a first memory page and the first memory page maps to a first set of the cache in the first group of ways and to a second set in the cache in a second group of ways of the plurality of groups of ways, the second set being a different set than the first set.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for updating replacement policy data for a cache that stores translations from a first address space to a second address space, the cache including a plurality of sets, each set including a plurality of ways divided into a plurality of groups of ways, the method comprising:
    detecting an update to a first cache entry of the cache, the first cache entry of the cache being associated with a first set of the plurality of sets and with a first group of ways of the plurality of groups of ways;
    responsive to the update to the first cache entry, modifying a first replacement policy data entry corresponding to the first cache entry and the first group of ways, the first replacement policy data entry being associated with a first level of generality, the modifying causing the first replacement policy data entry to indicate that the first cache entry of the cache is not least recently used for the first level of generality;
    responsive to the modifying the first replacement policy data entry, identifying a second replacement policy data entry associated with a second level of generality that is more specific than the first level of generality, the second replacement policy data entry also being associated with the first cache entry and with the first group of ways; and
    modifying the second replacement policy data entry to also indicate that the first cache entry of the cache is not least recently used for the second level of generality.

2. The method of claim 1, wherein the first cache entry is configured to store translations from virtual addresses to physical addresses.

3. The method of claim 1, wherein:
    the first cache entry stores a translation for a first memory page; and
    the first memory page maps to a first set of the cache in the first group of ways and to a second set in the cache in a second group of ways of the plurality of groups of ways, the second set being a different set than the first set.

4. The method of claim 1, further comprising:
    detecting a miss in the cache;
    responsive to the miss, fetching an item to be placed in the first cache entry of the cache;
    identifying the first set, and the first group of ways for the item based on an address associated with the item and on the first level of generality, which is associated with the item; and
    identifying a way of the group of ways based on the first replacement policy data entry,
    wherein the update to the first cache entry of the cache is performed on the identified way, set, and group of ways.

5. The method of claim 4, wherein identifying the way of the group of ways comprises:
    determining that the first replacement policy data entry indicates that the way of the group of ways stores a least-recently-used cache entry for the page size associated with the item.

6. The method of claim 4, wherein:
    the first replacement policy data entry comprises one bit that indicates which way of the group of ways includes least-recently-used data.

7. The method of claim 1, further comprising:
    detecting a second update to a second cache entry of the cache;
    detecting a second modification to a third replacement policy data entry corresponding to the second cache entry, the third replacement policy data entry being associated with the second level of generality; and
    determining that the second page size is the most specific level of generality for data in the cache,
    wherein no other replacement data is modified responsive to the third replacement policy data entry being associated with the most specific level of generality for data in the cache.

8. A cache configured to store translations from a first address space to a second address space, the cache including a plurality of sets, each set including a plurality of ways divided into a plurality of groups of ways, the cache comprising:
    a cache memory storing cache data;
    a replacement policy memory storing replacement policy data; and
    a cache controller configured to:
        detect an update to a first cache entry of the cache memory, the first cache entry of the cache being associated with a first set of the plurality of sets and with a first group of ways of the plurality of groups of ways;
        responsive to the update to the first cache entry, modify a first replacement policy data entry corresponding to the first cache entry and the first group of ways, the first replacement policy data entry being associated with a first level of generality, the modifying causing the first replacement policy data entry to indicate that the first cache entry of the cache is not least recently used for the first level of generality;
        responsive to the modifying the first replacement policy data entry, identify a second replacement policy data entry associated with a second level of generality that is more specific than the first level of generality, the second replacement policy data entry also being associated with the first cache entry and with the first group of ways; and modify the second replacement policy data entry to also indicate that the first cache entry of the cache is not least recently used for the second level of generality.

9. The cache of claim 8, wherein the first cache entry is configured to store translations from virtual addresses to physical addresses.

10. The cache of claim 8, wherein:

the first cache entry stores a translation for a first memory page; and the first memory page maps to a first set of the cache in the first group of ways and to a second set in the cache in a second group of ways of the plurality of groups of ways, the second set being a different set than the first set.

11. The cache of claim 8, wherein the cache controller is further configured to:

detect a miss in the cache memory;

responsive to the miss, fetch an item to be placed in the first cache entry of the cache;

identify the first set, and the first group of ways for the item based on an address associated with the item and on the first level of generality, which is associated with the item; and identify a way of the group of ways based on the first replacement policy data entry, wherein the update to the first cache entry of the cache is performed on the identified way, set, and group of ways.

12. The cache of claim 11, wherein the cache controller is configured to identify the way of the group of ways by:

determining that the first replacement policy data entry indicates that the way of the group of ways stores a least-recently-used cache entry for the page size associated with the item.

13. The cache of claim 11, wherein:

the first replacement policy data entry comprises one bit that indicates which way of the group of ways includes least-recently-used data.

14. The cache of claim 8, wherein the cache controller is further configured to:

detect a second update to a second cache entry of the cache;

detect a second modification to a third replacement policy data entry corresponding to the second cache entry, the third replacement policy data entry being associated with the second level of generality; and determine that the second page size is the most specific level of generality for data in the cache, wherein no other replacement data is modified responsive to the third replacement policy data entry being associated with the most specific level of generality for data in the cache.

15. A processor, comprising:

an execution pipeline configured to execute instructions; and a cache configured to store translations from a first address space to a second address space, the cache including a plurality of sets, each set including a plurality of ways divided into a plurality of groups of ways, the cache comprising:

a cache memory storing cache data;

a replacement policy memory storing replacement policy data; and a cache controller configured to:

detect an update to a first cache entry of the cache memory, the first cache entry of the cache being associated with a first set of the plurality of sets and with a first group of ways of the plurality of groups of ways;

responsive to the modifying the first cache entry, modify a first replacement policy data entry corresponding to the first cache entry and the first group of ways, the first replacement policy data entry being associated with a first level of generality, the modifying causing the first replacement policy data entry to indicate that the first cache entry of the cache is not least recently used for the first level of generality;

responsive to the first modification to the first replacement policy data entry, identify a second replacement policy data entry associated with a second level of generality that is more specific than the first level of generality, the second replacement policy data entry also being associated with the first cache entry; and modify the second replacement policy data entry to also indicate that the first cache entry of the cache is not least recently used for the second level of generality.

16. The processor of claim 15, wherein the first cache entry is configured to store translations from virtual addresses to physical addresses.

17. The processor of claim 15, wherein:

the first cache entry stores a translation for a first memory page; and the first memory page maps to a first set of the cache in the first group of ways and to a second set in the cache in a second group of ways of the plurality of groups of ways, the second set being a different set than the first set.

* * * * *